United States Patent [19]

Shankland et al.

[11] Patent Number: 5,211,867

[45] Date of Patent: May 18, 1993

[54] AZEOTROPE-LIKE COMPOSITIONS OF PENTAFLUOROETHANE AND 1,1,1-TRIFLUOROETHANE

[75] Inventors: Ian R. Shankland; Theodore Atwood, both of Williamsville; Earl A. E. Lund, West Seneca; Hang T. Pham, North Tonawanda, all of N.Y.

[73] Assignee: Allied-Signal Inc., Morris Township, Morris County, N.J.

[21] Appl. No.: 741,202

[22] Filed: Jul. 30, 1991

Related U.S. Application Data

[63] Continuation of Ser. No. 372,985, Jun. 28, 1989, abandoned.

[51] Int. Cl.$^5$ ............................................. C09K 5/04
[52] U.S. Cl. .................................. 252/67; 62/114;
  203/67; 252/172; 252/DIG. 9
[58] Field of Search .............. 252/162, 170, 171, 172,
  252/364, DIG. 9, 67, 69; 62/114; 203/67

[56] References Cited

U.S. PATENT DOCUMENTS

| | | | |
|---|---|---|---|
| 2,101,993 | 12/1937 | Fleischer | 62/178 |
| 3,505,233 | 4/1970 | Clark | 252/67 |
| 3,732,150 | 5/1973 | Bailey | 203/44 |
| 4,303,536 | 12/1981 | Orfeo et al. | 252/67 |
| 4,943,388 | 7/1990 | Shankland et al. | 252/69 |
| 4,971,712 | 11/1990 | Gorski et al. | 252/69 |

FOREIGN PATENT DOCUMENTS

| | | |
|---|---|---|
| 430169 | 6/1991 | European Pat. Off. . |
| 430171 | 6/1991 | European Pat. Off. . |
| 92286 | 4/1989 | Japan . |
| 1-108292 | 4/1989 | Japan . |

OTHER PUBLICATIONS

*The Handbook of Solvents* (by Scheflan et al.) D. Van Nostrand Co., Inc. NY 1953, Chapter VI, pp. 52–54.
R. C. Downing, *Fluorocarbon Refrigerants Handbook,* Prentice Hall 1988, pp. 139–158.
*Research Disclosure* vol. 154 p. 4 Disclosure #15402 "Hydrogen-containing chlorofluorocarbons as refrigerants" (DuPont) Feb. 1977.

*Primary Examiner*—Linda Skaling
*Attorney, Agent, or Firm*—Jay P. Friedenson; Melanie L. Brown

[57] ABSTRACT

Azeotrope-like compositions comprising pentafluoroethane and 1,1,1-trifluoroethane are stable and have utility as refrigerants for heating and cooling.

15 Claims, No Drawings

AZEOTROPE-LIKE COMPOSITIONS OF PENTAFLUOROETHANE AND 1,1,1-TRIFLUOROETHANE

This application is a continuation of application Ser. No. 372,985 filed Jun. 28, 1989, now abandoned.

FIELD OF THE INVENTION

This invention relates to azeotrope-like or essentially constant-boiling mixtures of pentafluoroethane and 1,1,1-trifluoroethane. These mixtures are useful as refrigerants for heating and cooling.

CROSS-REFERENCE TO RELATED APPLICATION

Commonly assigned U.S. Pat. No. 4,943,388 discloses azeotrope-like mixtures of pentafluoroethane; 1,1,1-trifluoroethane; and chlorodifluoromethane.

BACKGROUND OF THE INVENTION

Fluorocarbon based fluids have found widespread use in industry for refrigeration applications such as air conditioning and heat pump applications.

Vapor compression is one type of refrigeration. In its simplest form, vapor compression involves changing the refrigerant from the liquid to the vapor phase through heat absorption at a low pressure and then from the vapor to the liquid phase through heat removal at an elevated pressure. First, the refrigerant is vaporized in the evaporator which is in contact with the body to be cooled. The pressure in the evaporator is such that the boiling point of the refrigerant is below the temperature of the body to be cooled. Thus, heat flows from the body to the refrigerant and causes vaporization. The formed vapor is then removed by means of a compressor in order to maintain the low pressure in the evaporator. The temperature and pressure of the vapor are then raised through the addition of mechanical energy by the compressor. The high-pressure vapor then passes to the condenser whereupon heat exchange with a cooler medium, the sensible and latent heats are removed with subsequent condensation. The hot liquid refrigerant then passes to the expansion valve and is ready to cycle again.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

Certain chlorofluoromethane and chlorofluoroethane derivatives have gained widespread use in refrigeration applications including air conditioning and heat pump applications owing to their unique combination of chemical and physical properties.

The majority of refrigerants utilized in vapor compression systems are either single components fluids or azeotropic mixtures. The use of azeotropic mixtures as refrigerants is known in the art: for example, see R. C. Downing, FLUOROCARBONS REFRIGERANTS HANDBOOK, Prentice-Hall, 1988 and U.S. Pat. Nos. 2,101,993 and 2,641,579.

R-502 is an azeotropic blend which consists of monochlorodifluoromethane(R-22) and chloropentafluoroethane(R-115), a fully halogenated chlorofluorocarbon. R-502 has been routinely used for medium to low temperature refrigeration applications.

Azeotropic or azeotrope-like compositions are desired because they do not fractionate upon boiling. This behavior is desirable because in the previously described vapor compression equipment with which these refrigerants are employed, condensed material is generated in preparation for cooling or for heating purposes. Unless the refrigerant composition exhibits a constant boiling point, i.e. is azeotrope-like, fractionation and segregation will occur upon evaporation and condensation and undesirable refrigerant distribution may act to upset the cooling or heating.

Non-azeotropic mixtures have been disclosed as refrigerants for example in U.S. Pat. No. 4,303,536 but have not found widespread use in commercial applications. The use of non-azeotropic mixtures which fractionate during the refrigeration cycle introduces additional complexity into the system which necessitates hardware changes. The use of non-azeotropic refrigerants has been avoided primarily due to the added difficulty in charging and servicing refrigeration equipment and the situation is further complicated if an inadvertent leak in the system occurs during use or during service. The composition of the mixture could change affecting system pressures and system performance. If one component of the nonazeotropic mixture is flammable, then fractionation could shift the composition into the flammable region with potential adverse consequences.

The art is continually seeking new fluorocarbon based azeotrope-like mixtures which offer alternatives for refrigeration and heat pump applications. Currently, of particular interest, are fluorocarbon based azeotrope-like mixtures which are considered to be environmentally safe substitutes for the presently used fully halogenated chlorofluorocarbons(CFC's). The latter are suspected of causing environmental problems in connection with the earth's protective ozone layer.

The substitute materials must also possess those properties unique to the CFC's including chemical stability, low toxicity, non-flammability, and efficiency in-use. The latter characteristic is important in refrigeration and air-conditioning especially where a loss in refrigerant thermodynamic performance or energy efficiency may have secondary environmental impacts through increased fossil fuel usage arising from an increased demand for electrical energy. Furthermore, the ideal CFC refrigerant substitute would rot require major engineering changes to conventional vapor compression technology currently used with CFC refrigerants. Mathematical models have substantiated that hydrofluorocarbons, such as pentafluoroethane(HFC-125) and 1,1,1-trifluoroethane(HFC-143a) will not adversely affect atmospheric chemistry, being negligible contributors to ozone depletion and to green-house global warming in comparison to the fully halogenated species.

Because HFC-143a is as efficient as R-502 and provides a modest increase in refrigeration capacity, HFC-143a might be considered a good refrigerant substitute for R-502. However, a disadvantage of HFC-143a as a refrigerant is that the vapor of HFC-143a is flammable. As a result, the shipping, handling, and use of HFC-143a have to be carefully controlled due to the potential flammibility.

Because HFC-125 is nonflammable and provides a modest increase in refrigeration capacity compared with R-502, HFC-125 might be considered a good refrigerant substitute for R-502. However, a disadvantage of HFC-125 is that HFC-125 is about 5% less efficient than R-502.

It is an object of this invention to provide novel azeotrope-like compositions based on pentafluoroethane and 1,1,1-trifluoroethane which will not fractionate under normal cooling or heating conditions.

Another object of the invention is to provide novel environmentally acceptable refrigerants for use in the aforementioned applications.

Other objects and advantages of the invention will become apparent from the following description.

DESCRIPTION OF THE INVENTION

In accordance with the invention, novel azeotrope-like compositions have been discovered comprising pentafluoroethane and 1,1,1-trifluoroethane. The azeotrope-like compositions comprise from about 1 to about 80 weight percent pentafluoroethane and from about 20 to about 99 weight percent 1,1,1-trifluoroethane which have a vapor pressure of about 167 psia(1113 kpa)±about 6 psia(40 kpa) at 70° F.(21.1° C.). These compositions are azeotrope-like because they are constant-boiling i.e. exhibit essentially constant-vapor pressure versus composition and essentially identical liquid and vapor compositions over the aforementioned compositional ranges.

In a preferred embodiment of the invention, the azeotrope-like compositions of the invention comprise from about 38.4 to about 80 weight percent pentafluoroethane and from about 20 to about 61.6 weight percent 1,1,1-trifluoroethane. Vapor phase compositions containing in excess of about 38.4 weight percent pentafluoroethane were determined to be nonflammable in air at ambient conditions using the ASTM E-681 method as specified in the American Society of Heating. Refrigerating, and Air-Conditioning Engineers(ASHRAE) Standard 34.

In a most preferred embodiment of the invention. the azeotrope-like compositions of the invention comprise from about 40 to about 80 weight percent pentafluoroethane and from about 20 to about 60 weight percent 1,1,1-trifluoroethane. These compositions are constant-boiling. non-segregating, and nonflammable.

These most preferred azeotrope-like compositions of the invention have a vapor pressure of about 167 psia(1113 kpa)±about 4 psia(27 kpa) at 70° F.(21.1° C.).

A blend of HFC-125 and HFC-143a was disclosed as having utility as a refrigerant in RESEARCH DISCLOSURE 15402, Feb. 1977 but this disclosure implied that such a blend was non-azeotropic. i.e. would fractionate upon evaporation or condensation, and stated that the blend was disadvantageous because it was flammable. Contrary to this teaching, we have discovered that the blends of HFC-125 and HFC-143a as recited above are both constant-boiling, i.e. azeotrope-like, and are nonflammable.

The term "azeotrope-like is used herein for the mixtures of the invention because in the claimed proportions, the compositions of pentafluoroethane and 1,1,1-trifluoroethane are constant-boiling or essentially constant-boiling.

All compositions within the indicated ranges, as well as certain compositions outside the indicated ranges, are azeotrope-like, as defined more particularly below.

From fundamental principles, the thermodynamic state of a fluid is defined by four variables: pressure. temperature, liquid composition and vapor composition, or P-T-X-Y, respectively. An azeotrope is a unique characteristic of a system of two or more components where X and Y are equal at the stated p and T. In practice. this means that the components of a mixture cannot be separated during a phase change, and therefore are useful in the cooling and heating applications as described above.

For the purpose of this discussion, azeotrope-like composition is intended to mean that the composition behaves like an azeotrope. i.e. has constant-boiling characteristics or a tendency not to fractionate upon boiling or evaporation. Thus, in such compositions, the composition of the vapor formed during boiling or evaporation is identical or substantially identical to the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

Thus, one way to determine whether a candidate mixture is "azeotrope-like" within the meaning of this invention, is to distill a sample thereof under conditions (i.e. resolution - number of plates) which would be expected to separate the mixture into its separate components. If the mixture is non-azeotropic or non-azeotrope-like. the mixture will fractionate, i.e. separate into its various components with the lowest boiling component distilling off first, and so on. If the mixture is azeotrope-like, some finite amount of a first distillation cut will be obtained which contains all of the mixture components and which is constant-boiling or behaves as a single substance. This phenomenon cannot occur if the mixture is not azeotrope-like i.e.. it is not part of an azeotropic system.

It follows from the above that another characteristic of azeotrope-like compositions is that there is a range of compositions containing the same components in varying proportions which are azeotrope-like or constant-boiling. All such compositions are intended to be covered by the term azeotrope-like or constant-boiling as used herein. As an example, it is well known that at differing pressures, the composition of a given azeotrope will vary at least slightly as does the boiling point of the composition. Thus, an azeotrope of A and B represents a unique type of relationship but with a variable composition depending on temperature and/or pressure. As is readily understood by persons skilled in the art, the boiling point of the azeotrope will vary with the pressure.

In one process embodiment of the invention, the azeotrope-like compositions of the invention may be used in a method for producing refrigeration which comprises condensing a refrigerant comprising the azeotrope-like compositions and thereafter evaporating the refrigerant in the vicinity of a body to be cooled.

In another process embodiment of the invention, the azeotrope-like compositions of the invention may be used in a method for producing heating which comprises condensing a refrigerant comprising the azeotrope-like compositions in the vicinity of a body to be heated and thereafter evaporating the refrigerant.

The pentafluoroethane and 1,1,1-trifluoroethane of the novel azeotrope-like compositions of the invention are known materials, preferably, the materials should be used in sufficiently high purity so as to avoid the introduction of adverse influences upon the cooling or heating properties or constant-boiling properties of the system.

The present invention is more fully illustrated by the following non-limiting Examples.

EXAMPLE 1

This example shows that certain compositions of pentafluoroethane and 1,1,1-trifluoroethane are azeotrope-like. i.e. exhibit essentially identical liquid and vapor compositions, and are constant-boiling i.e. exhibit essentially constant vapor pressure versus composition within this range.

Vapor liquid equilibrium experiments were performed by preparing mixtures of HFC-125 and HFC-143a in an approximately 150 cubic centimeter vessel. The vessel. equipped with a magnetically driven stirrer and a 0–300 psia(0–2068 kpa) pressure transducer accurate to ±0.2%, was submerged in a constant temperature bath controlled to within±0.05° F.(0.03° C.). Once thermal equilibrium was attained, as determined by constant vapor pressure readings, vapor and liquid samples were withdrawn from the vessel and analyzed by standard gas chromatographic techniques. This procedure was repeated at three nominal compositions of about 25, 50, and 75 weight percent HFC-125 in HFC-143a, and at three temperatures of −10° F.(−23.3° C.), 70° F.(21.1° C.), and 112.5° F.(44.7° C.). Table I summarizes the results of these experiments. In Table I, the compositions are in weight percent HFC-125 in HFC-143a.

TABLE I

VAPOR LIQUID EQUILIBRIA DATA

| Temperature °F. (°C.) | Liquid Composition (Weight Percentage HFC-125) | Vapor Composition (Weight Percentage HFC-125) | Vapor Pressure psia (kPa) |
| --- | --- | --- | --- |
| −10.0 (−23.3) | 0.0 | 0.0 | 40.2 (268) |
| −10.0 (−23.3) | 22.4 | 22.1 | 40.1 (267) |
| −10.0 (−23.3) | 51.2 | 52.0 | 40.1 (267) |
| −10.0 (−23.3) | 76.1 | 77.0 | 41.0 (273) |
| −10.0 (−23.3) | 100.0 | 100.0 | 43.5 (290) |
| 70.0 (21.1) | 0.0 | 0.0 | 165.2 (1101) |
| 70.0 (21.1) | 22.5 | 22.8 | 165.2 (1101) |
| 70.0 (21.1) | 51.0 | 52.3 | 167.1 (1114) |
| 70.0 (21.1) | 76.0 | 77.7 | 171.6 (1144) |
| 70.0 (21.1) | 100.0 | 100.0 | 180.0 (1200) |
| 112.5 (44.7) | 0.0 | 0.0 | 297.9 (1986) |
| 112.5 (44.7) | 22.4 | 23.1 | 299.2 (1995) |
| 112.5 (44.7) | 50.9 | 50.6 | 300.9 (2006) |
| 112.5 (44.7) | 76.2 | 78.0 | 309.9 (2066) |
| 112.5 (44.7) | 100.0 | 100.0 | 326.0 (2173) |

The data shown in Table I indicate that the vapor and liquid compositions are essentially identical within the experimental uncertainty of ±1.0 weight percent unit associated with the chromatographic analysis. The vapor pressures of the blends are essentially constant to within ±2% over the composition range from about 1 to about 80 weight percent HFC-125 and from about 99 to about 20 weight percent HFC-143a, i.e. these blends are constant-boiling or azeotrope-like.

EXAMPLE 2

This example shows that certain HFC-125/HFC-143a blends are nonflammable.

Flammability measurements were performed using the ASTM E-681 technique modified according to ASHRAE Standard 34. Briefly, this technique involves preparing fluorocarbon/air gas mixtures to a total pressure of one atmosphere(101 kpa) in a 5-liter spherical glass vessel, stirring the mixture with a magnetically driven propeller to ensure a uniform composition, and then attempting to ignite the mixture using an electrically activated kitchen match head as the ignition source. A ternary flammability diagram was mapped by preparing mixture; of HFC-125, HFC-143a, and air by the method of partial pressures and then determining whether or not a flame would propagate as defined by ASTM E-681. The critical flammability composition. i.e. the composition of the HFC-125/HFC-143a blend which contains the maximum proportion of the flammable HFC-143a but does not exhibit flame limits in air, was determined in a graphical manner similar to that described in Haenni et al. *Industrial and Engineering Chemistry* 51, 685(1959). The critical flammability composition was found to be 61.6 weight percent HFC-143a and about 38.4 weight percent HFC-125. In other words. blends of HFC-125 and HFC-143a containing 38.4 or more weight percent HFC-125 are nonflammable in all proportions in air at ambient conditions.

EXAMPLE 3

This example shows that a blend of 50 weight percent HFC-125 and 50 weight percent HFC-143a undergoes essentially no fractionation and maintains a constant-vapor pressure during a vapor leak which illustrates one advantage of a constant-boiling or azeotrope-like composition.

The vessel described in Example 1 was charged with approximately 105 grams of a 50/50 weight percent mixture of HFC-125 and HFC-143a. Vapor was allowed to leak from this container until about 14 weight percent of the original charge had dissipated, at which point the vapor pressure of the remaining liquid was measured and a vapor phase sample collected for analysis. The vapor leak was continued until 80% of the original charge had dissipated; additional vapor samples were taken for analysis at different stages during the leak. The temperature of the vessel was maintained at 70° F.(21.1° C.) during the leak. Vapor pressure and composition data are reported in Table II. In Table II, the composition is in weight percent HFC-125 in HFC-143a.

TABLE II

FRACTIONATION DATA

| Percent Dissipation | Vapor Pressure psia (kPa) | Vapor Composition (Weight Percent HFC-125) |
| --- | --- | --- |
| 0.0 | 167.3 (1115) | 50.0 |
| 14.4 | 167.0 (1113) | 50.4 |
| 31.7 | 166.2 (1108) | 49.8 |
| 48.5 | 165.4 (1103) | 49.6 |
| 64.3 | 164.7 (1098) | 48.8 |
| 79.9 | 163.3 (1089) | 48.8 |
| Residue liquid | | 48.6 |

TABLE II-continued

FRACTIONATION DATA

| Percent Dissipation | Vapor Pressure psia (kPa) | Vapor Composition (Weight Percent HFC-125) |
|---|---|---|
| Residue vapor | | 48.6 |

The data listed in Table II show that the composition of the mixture varies by no more than 1.2 weight percent and that the vapor pressure remains constant within 4 psia (27 kpa) or about 2.5% of the total pressure.

EXAMPLE 4

This example shows that constant-boiling HFC-125/HFC-143a blends have certain advantages when compared to other refrigerants which are currently used in certain refrigeration cycles.

The theoretical performance of a refrigerant at specific operating conditions can be estimated from the thermodynamic properties of the refrigerant using standard refrigeration cycle analysis techniques; see for example, R. C. Downing, FLUOROCARBONS REFRIGERANTS HANDBOOK, Chapter 3, prentice-Hall, 1988. The coefficient of performance(COP) is a universally accepted measure, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the volumetric effectiveness of the refrigerant. To a compressor engineer, this value expresses the capability of a compressor to pump quantities of heat for a given volumetric flow rate of refrigerant. In other words, given a specific compressor, a refrigerant with a higher capacity will deliver more cooling or heating power.

We have performed this type of calculation for a medium to low temperature refrigeration cycle where the condenser temperature is typically 100° F.(38° C.) and the evaporator temperature is typically −40° to −10° F.(−40° to −23.3° C.). We have further assumed isentropic compression and a compressor inlet temperature of 65° F.(18.3° C.). Such calculations were performed for a 60/40 by weight percent blend of HFC-125 and HFC-143a as well as for R-502. Table III lists the COP of a 60/40 blend of HFC-125 and HFC-143a relative to that of R-502 over a range of evaporator temperatures. In Table III, the * indicates that COP and capacity are given relative to R-502.

TABLE III

THERMODYNAMIC PERFORMANCE

| Evaporator Temp. °F. (°C.) | COP* | Capacity* | R-502 Discharge Temp. °F. (°C.) | 125/143a Discharge Temp. °F. (°C.) |
|---|---|---|---|---|
| −40 (−40) | 1.01 | 1.08 | 235 (113) | 213 (101) |
| −30 (−34) | 1.00 | 1.07 | 220 (104) | 200 (93) |
| −20 (−29) | 0.99 | 1.07 | 205 (96) | 189 (87) |
| −10 (−23) | 0.99 | 1.06 | 192 (89) | 177 (81) |

The data listed in Table III show that the HFC-125/HFC-143a blend provides essentially the same COP(within ±1%) as that attainable with R-502. provides about a 7% increase in refrigeration capacity, and also produces lower discharge temperatures from the compressor, which contributes to compressor reliability. It has been recommended that compressor discharge temperatures be limited to about 225° F.(107.2° C.). This temperature is exceeded in the current example by R-502 at evaporator temperatures lower than −35° F.(−37.2° C.): the HFC-125/HFC-143a blend can operate down to an evaporator temperature of −50° F.(−45.6° C.) before exceeding the 225° F.(107.2° C.) discharge temperature limit. Even lower evaporator temperatures could be accomplished by enriching the HFC-125 component up to 80% of the total mixture. without significant impact on the performance.

Having described the invention in detail and by reference to preferred embodiments thereof, it will be apparent that modifications and variations are possible without departing from the scope of the invention defined in the appended claims.

What is claimed is:

1. Azeotrope-like compositions consisting essentially of from 60 to about 38.4 weight percent pentafluoroethane and from 40 to about 61.6 weight percent 1,1,1-trifloroethane which have a vapor pressure below that of both pentafluoroethane and 1,1,1-trifluoroethane at −10° F., wherein the azeotrope-like components consist of said pentafluoroethane and 1,1,1-trifluorethane.

2. Azeotrope-like compositions according to claim 1 consisting essentially of from about 51 to about 38.4 weight percent pentafluorethane and from 49 to about 61.6 weight percent 1,1,1-trifluorethane.

3. Azeotrope-like compositions according to claim 2 consisting essentially of about 51 weight percent pentafluoroethane and about 49 weight percent 1,1,1-trifluoroethane.

4. Azeotrope-like compositions according to claim 2 consisting essentially of about 40 weight percent pentafluoroethane and about 60 weight percent 1,1,1-trifluoroethane.

5. Azeotrope-like compositions according to claim 2 consisting essentially of about 49 weight percent pentafluoroethane and about 51 weight percent 1,1,1-trifluoroethane.

6. A method for producing refrigeration which comprises condensing a refrigerant consisting essentially of an azeotrope-like composition as described in claim 1 and thereafter evaporating said refrigerant in the vicinity of a body to be cooled.

7. A method for producing refrigeration which comprises condensing a refrigerant consisting essentially of an azeotrope-like composition as described in claim 2 and thereafter evaporating said refrigerant in the vicinity of a body to be cooled.

8. A method for producing refrigeration which comprises condensing a refrigerant consisting essentially of an azeotrope-like composition as described in claim 3 and thereafter evaporating said refrigerant in the vicinity of a body to be cooled.

9. A method for producing refrigeration which comprises condensing a refrigerant consisting essentially of an azeotrope-like composition as described in claim 4 and thereafter evaporating said refrigerant in the vicinity of a body to be cooled.

10. A method for producing refrigeration which comprises condensing a refrigerant consisting essentially of an azeotrope-like composition as described in claim 5 and thereafter evaporating said refrigerant in the vicinity of a body to be cooled.

11. A method for producing heating which comprises condensing a refrigerant consisting essentially of an azeotropic composition as described in claim 1 in the vicinity of a body to be heated and thereafter evaporating said refrigerant.

12. A method for producing heating which comprises condensing a refrigerant consisting essentially of an azeotropic composition as described in claim 2 in the vicinity of a body to be heated and thereafter evaporating said refrigerant.

13. A method for producing heating which comprises condensing a refrigerant consisting essentially of an azeotropic composition as described in claim 3 in the vicinity of a body to be heated and thereafter evaporating said refrigerant.

14. A method for producing heating which comprises condensing a refrigerant consisting essentially of an azeotropic composition as described in claim 4 in the vicinity of a body to be heated and thereafter evaporating said refrigerant.

15. A method for producing heating which comprises condensing a refrigerant consisting essentially of an azeotropic composition as described in claim 5 in the vicinity of a body to be heated and thereafter evaporating said refrigerant.

* * * * *